US008508480B2

(12) United States Patent
Plestid

(10) Patent No.: US 8,508,480 B2
(45) Date of Patent: Aug. 13, 2013

(54) METHOD AND APPARATUS TO FACILITATE NON-FLUSH GENERAL NAVIGATION BUTTONS FOR A CLAMSHELL HANDHELD DEVICE

(75) Inventor: Trevor Plestid, Waterloo (CA)

(73) Assignee: Research In Motion Limited, Waterloo (CA)

( * ) Notice: Subject to any disclaimer, the term of this patent is extended or adjusted under 35 U.S.C. 154(b) by 861 days.

(21) Appl. No.: 12/351,085

(22) Filed: Jan. 9, 2009

(65) Prior Publication Data

US 2010/0177044 A1 Jul. 15, 2010

(51) Int. Cl.
*G06F 3/033* (2013.01)

(52) U.S. Cl.
USPC ........... 345/167; 345/156; 345/161; 345/164; 345/169

(58) Field of Classification Search
None
See application file for complete search history.

(56) References Cited

U.S. PATENT DOCUMENTS

| | | | |
|---|---|---|---|
| 6,269,256 B1 * | 7/2001 | Nakamura | 455/567 |
| 6,463,304 B2 * | 10/2002 | Smethers | 455/566 |
| 7,117,009 B2 * | 10/2006 | Wong et al. | 455/556.1 |
| 7,274,954 B2 * | 9/2007 | Oldham | 455/575.3 |
| 7,449,737 B2 * | 11/2008 | Lenoble et al. | 257/292 |
| 7,460,893 B2 * | 12/2008 | Aarras | 455/575.3 |
| 7,492,354 B2 * | 2/2009 | Bartholomew et al. | 345/169 |
| 7,738,656 B2 * | 6/2010 | Yoda | 379/433.01 |
| 7,912,521 B2 * | 3/2011 | Jeong | 455/575.3 |
| 7,958,644 B2 * | 6/2011 | Boeve et al. | 33/355 R |
| 2002/0086698 A1 * | 7/2002 | Sawada et al. | 455/550 |
| 2002/0102946 A1 * | 8/2002 | SanGiovanni | 455/90 |
| 2003/0064758 A1 * | 4/2003 | Mizuta et al. | 455/566 |
| 2004/0185920 A1 * | 9/2004 | Choi et al. | 455/575.1 |
| 2004/0203532 A1 * | 10/2004 | Mizuta | 455/90.3 |
| 2005/0219216 A1 * | 10/2005 | Yoshikawa | 345/167 |
| 2006/0139328 A1 * | 6/2006 | Maki et al. | 345/161 |
| 2006/0197753 A1 * | 9/2006 | Hotelling | 345/173 |
| 2010/0062810 A1 * | 3/2010 | Griffin | 455/566 |

FOREIGN PATENT DOCUMENTS

| | | |
|---|---|---|
| EP | 0962852 A2 | 12/1999 |
| EP | 1463273 A2 | 9/2004 |
| EP | 1881680 A1 | 1/2008 |
| GB | 2413028 A | 12/2005 |
| WO | 2004021685 A1 | 3/2004 |
| WO | 2006030002 A1 | 3/2006 |

OTHER PUBLICATIONS

Jan Horalik, Nokia 6555 review: 3G with a flip, GSMArena.com, Jan. 25, 2008, http://www.gsmarena.com/stats.php3/forum/nokia_6555-review-207.php.
Office Action; Canadian Patent Application No. 2,688,602; Nov. 1, 2012.

* cited by examiner

*Primary Examiner* — Dismery Mercedes
(74) *Attorney, Agent, or Firm* — Ridout & Maybee LLP

(57) ABSTRACT

A handheld device comprising a first portion and a second portion rotatably coupled to the first portion. The handheld device is movable between an opened configuration and a closed configuration. A non-flush navigation button is coupled to one of the first and the second portion wherein the non-flush navigation button is disposed in a position that is accessible for manipulation in both the opened and the closed configurations.

21 Claims, 9 Drawing Sheets

METHOD AND APPARATUS TO FACILITATE NON-FLUSH GENERAL NAVIGATION BUTTONS FOR A CLAMSHELL HANDHELD DEVICE

TECHNICAL FIELD

The present disclosure relates generally to navigation buttons for clamshell handheld devices, and more particularly to a method and apparatus to facilitate non-flush general navigation buttons for such devices.

BACKGROUND

A clamshell mobile or handheld communication device generally has a base and a hinged or sliding lid that can be closed over the base. Such devices generally provide a user with a primary display inside the lid or on the base that is visible when the device is open and provides the user with a user interface. Furthermore, some clamshell devices have a secondary display on the outside of the lid that is visible when the device is closed and provides the user with a secondary user interface.

The device may be provided with navigation tools or buttons on the base or inside the lid that may be accessed when the device is opened. Such buttons may include a keypad, a scroll wheel, a trackball, or other similar mechanisms. These buttons are enclosed within the device when the device is closed. As such, it is often necessary to provide buttons that do not protrude from the base, to avoid the buttons being compressed between the halves of the device, which may damage the buttons and/or the display immediately upon compression or over time. Alternatively, the lid and/or base may be designed with space, such as a depression, to accommodate any protruding buttons when the device is closed. It may also be necessary to provide additional navigation buttons on the exterior of the device, so as to be accessible when the device is closed, for the purpose of navigating a user interface on the secondary display.

It is often desirable to provide a handheld device that has as slim a profile as possible, to make it light and portable as well as aesthetically pleasing. However, this becomes a challenge for clamshell devices since there is less space to accommodate the buttons, whether protruding or non-protruding, on the base when the device is closed. This is one barrier to providing trackball, joystick or rocker style navigation buttons in a clamshell device. Such buttons typically protrude at least a few millimeters from the base in order to be accessible and used by a user's finger. As explained above, this would result in the button pressing against the inside of the lid when the device is closed, which may damage the display and/or the button.

A solution would be to provide a depression on the inside of the lid to accommodate such protruding buttons when the device is closed. However, this necessarily increases the thickness of the device. The trend is typically towards thinner devices, some perhaps as little as 10 mm thick when closed. Since a protruding button may need to protrude as much as 2 mm, providing a depression to accommodate such a button takes up a significant amount of space on a thin device and significantly limits how thin the device may be.

Another solution is to provide the button in a flush mount. That is, the button is provided in a depression on the base of the device. However, in order to maintain the thinness of the device, such a flush mount may be very shallow and wide, taking up a large amount of the limited space on the base of the device, and making the button difficult to access by a user's finger, particularly if the user has a large fingertip that might not fit in the depression, and detracting from the usability of the button. Further, the presence of a depression also presents mechanical limitations in the design and layout of the device and its circuitry. Space for circuitry in a handheld device is very limited, and typically it is desirable to maximize useable circuitry space within the device as much as possible. In a clamshell device, the spaces within both the lid and the base are typically almost entirely filled with circuitry. The presence of a depression for accommodating a protruding button takes up significant space, limiting the amount and the type of circuitry that may fit within the device underneath the depression. For example, only flat components may be used in the space immediately below such a depression.

BRIEF DESCRIPTION OF THE DRAWINGS

Reference will now be made to the drawings, which show by way of example embodiments of the present disclosure, and in which.

It will be noted that throughout the appended drawings, like features are identified by like reference numerals.

DETAILED DESCRIPTION

Figure 1:
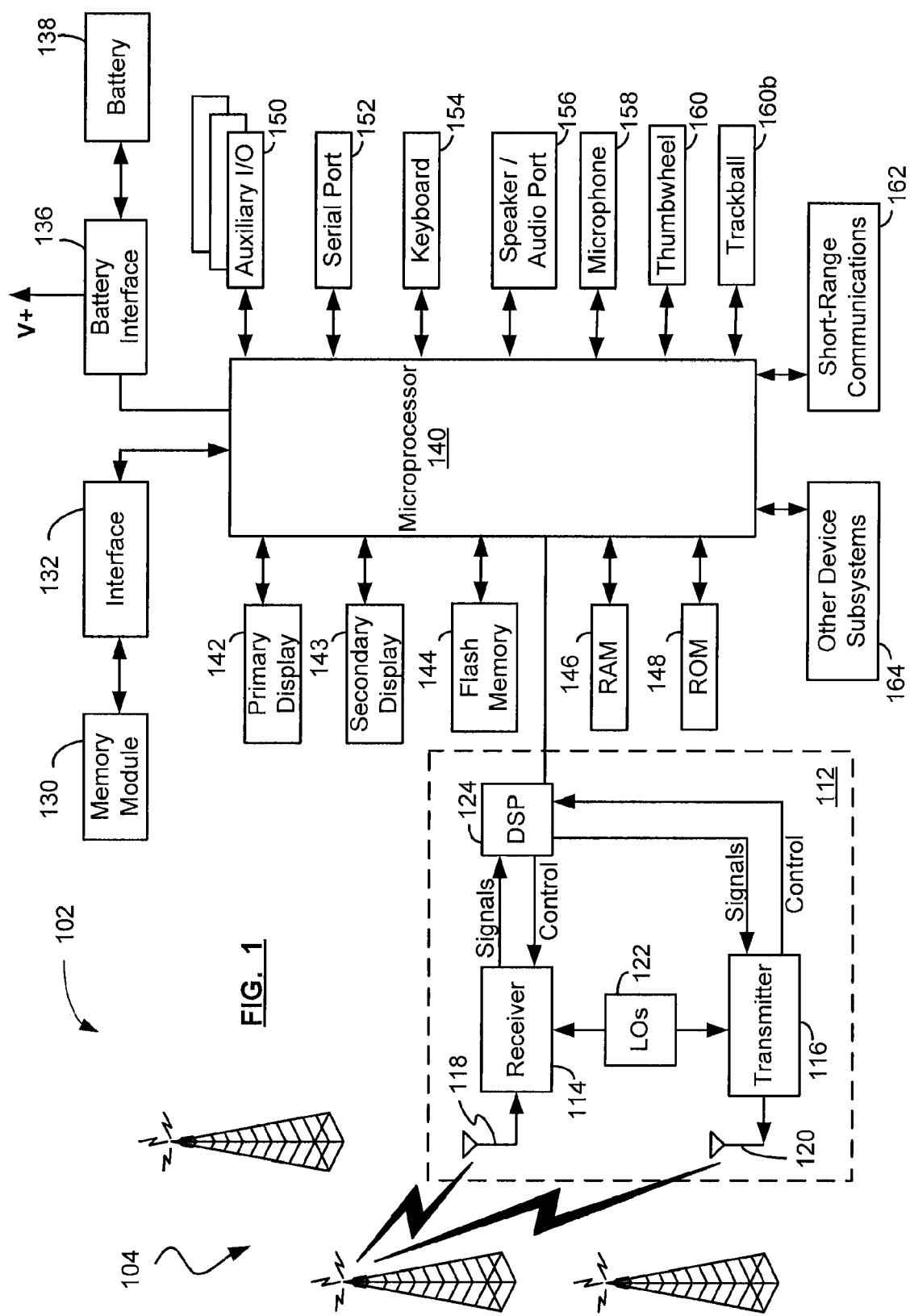
FIG. 1 shows in block diagram form a handheld device that may be configured to facilitate non-flush general navigation buttons, in accordance with an embodiment.

In some aspects, there is provided a handheld device comprising: a first portion; a second portion rotatably coupled to the first portion, the first and the second portion being rotatable relative to each other about an axis of rotation, such that the handheld device is movable between an opened configuration and a closed configuration; a non-flush navigation button coupled to one of the first and the second portion; wherein the non-flush navigation button is disposed in a position that is accessible for manipulation in both the opened and the closed configurations.

In some aspects, there is provided a method for facilitating a non-flush navigation button in a handheld device having a first portion and a second portion rotatably coupled together such that the handheld device is movable between an opened and a closed configuration, the navigation button having a primary button orientation in the opened configuration and a secondary button orientation in the closed configuration, the method comprising: detecting whether the device is in the opened or the closed configuration; processing navigation input using the navigation button in a primary or a secondary navigation orientation corresponding to the primary or secondary button orientation of the navigation button; detecting whether the device has changed configuration; and if the device has changed configuration, flipping the navigation orientation to correspond to the button orientation.

In some aspects, there is provided the device described above, further comprising: a microprocessor for controlling the operation of the handheld device, the non-flush navigation button being coupled to the microprocessor for accepting an input; a display device for showing a user interface, the display device being coupled to the microprocessor for communicating an output to the user; a communications subsystem coupled to the microprocessor for communicating with a communications network; a memory coupled to the microprocessor; and a storage device coupled to the microprocessor; the handheld device including a navigation module resident in the memory for execution by the microprocessor, the navigation module being configured to: detect whether the device is in the opened or the closed configuration; process navigation input using the navigation button in a primary or a secondary navigation orientation corresponding to the primary or secondary button orientation of the navigation button; detect whether the device has changed configuration; and if the device has changed configuration, flip the navigation orientation to correspond to the button orientation.

In some aspects, there is provided a computer program product having a computer readable medium tangibly embodying code for facilitating a non-flush navigation button in a handheld device, the device having a first portion and a second portion rotatably coupled together such that the device is movable between an opened configuration and a closed configuration, the computer program product comprising: code for detecting whether the device is in the opened or the closed configuration; code for processing navigation input using the navigation button in a primary or a secondary navigation orientation corresponding to the primary or secondary button orientation of the navigation button; code for detecting whether the device has changed configuration; and code for flipping the navigation orientation to correspond to the button orientation, if the device has changed configuration.

Reference is first made to FIG. 1, which shows a block diagram illustrating a handheld device 102 suitable for facilitating non-flush general navigation buttons in accordance with an embodiment of the present disclosure. It will be understood that references to a handheld device in this disclosure may also refer to a handheld device with multiple screens or displays, a clamshell handheld device or to a clamshell mobile communication device. The teachings of this disclosure may be applicable to any handheld device having an opened and a closed configuration, with two halves rotationally connected together, and is not limited to a strict definition of "clamshell" devices. Examples of handheld devices may include wireless communication devices such as a mobile phone or a personal digital assistant. Handheld devices may also include devices such as a remote control and other similar devices that may be easily carried in a single hand. By "non-flush" is meant that the button protrudes beyond the surface of the base on which it is provided, and that the button is not set within a depression or a bevel in the base. Examples of non-flush general navigation buttons may include trackballs, joysticks and rocker buttons. Typically, such general navigation buttons may provide navigation of a user interface in more than one dimension, for example allowing the user to freely navigate the user interface without being limited to only navigation by scrolling.

The handheld device is for example a wireless device 102 that communicates through a wireless communication network 104. The wireless network 104 includes antennae, base stations, and supporting radio equipment as for supporting wireless communications between the wireless device 102 and other devices connected to wireless network 104. The wireless network 104 may be coupled to a wireless network gateway and to a wide area network, shown in FIG. 2.

In an embodiment, the wireless device 102 is a two-way mobile communication device having at least voice and data communication capabilities, including the capability to communicate with other computer systems. In an embodiment, the wireless device 102 is a clamshell handheld device. Depending on the functionality provided by the wireless device 102, it may be referred to as a data messaging device, a two-way pager, a cellular telephone with data messaging capabilities, a wireless Internet appliance, a data communication device (with or without telephony capabilities), a clamshell device, or a flip-phone. The wireless device 102 may communicate with any one of a plurality of fixed transceiver stations within its geographic coverage area.

The wireless device 102 may incorporate a communication subsystem 112, which includes a receiver 114, a transmitter 116, and associated components, such as one or more antenna elements 118 and 120, local oscillators (LOs) 122, and a processing module such as a digital signal processor (DSP) 124. In an embodiment, the antenna elements 118 and 120 may be embedded or internal to the wireless device 102. As will be apparent to those skilled in the field of communications, the particular design of the communication subsystem 112 depends on the wireless network 104 in which the wireless device 102 is intended to operate.

The wireless device 102 may send and receive communication signals over the wireless network 104 after the required network registration or activation procedures have been completed. Signals received by the antenna 118 through the wireless network 104 are input to the receiver 114, which may perform such common receiver functions as signal amplification, frequency down conversion, filtering, channel selection, etc., as well as analog-to-digital (A/D) conversion. A/D conversion of a received signal allows more complex communication functions such as demodulation and decoding to be performed in the DSP 124. In a similar manner, signals to be transmitted are processed, including modulation and encoding, for example, by the DSP 124. These DSP-processed signals are input to the transmitter 116 for digital-to-analog (D/A) conversion, frequency up conversion, filtering, amplification, and transmission to the wireless network 104 via the antenna 120. The DSP 124 not only processes communication signals, but also provides for receiver and transmitter control. For example, the gains applied to communication signals in the receiver 114 and the transmitter 116 may be adaptively controlled through automatic gain control algorithms implemented in the DSP 124.

Network access is associated with a subscriber or user of the wireless device 102 via a memory module, such as a memory module 130, which may be a Subscriber Identity Module (SIM) card for use in a GSM network or a Universal Subscriber Identity Module (USIM) card for use in a Universal Mobile Telecommunication System (UMTS). The SIM card is inserted in or connected to an interface 132 of the wireless device 102 in order to operate in conjunction with the wireless network 104. Alternatively, the wireless device 102 may have an integrated identity module for use with systems such as Code Division Multiple Access (CDMA) systems.

The wireless device 102 also includes a battery interface 136 for receiving one or more rechargeable batteries 138. The battery 138 provides electrical power to at least some of the electrical circuitry in the wireless device 102, and the battery interface 136 provides a mechanical and electrical connection for the battery 138. The battery interface 136 is coupled to a regulator (not shown) which provides power V+ to the circuitry of the wireless device 102.

The wireless device 102 includes a microprocessor 140 which controls the overall operation of the wireless device 102. Communication functions, including at least data and voice communications, are performed through the communication subsystem 112. The microprocessor 140 also interacts with additional device subsystems such as a primary display 142, a secondary display 143, a flash memory 144, a random access memory (RAM) 146, a read-only memory (ROM) 148, auxiliary input/output (I/O) subsystems 150, a data port such as serial port 152, a keyboard or keypad 154, a speaker or audio port 156 for connecting to, for example a set of headphones or an earpiece, a microphone 158, a clickable thumbwheel or thumbwheel 160, a trackball 160b, a short-range communications subsystem 162, and any other device subsystems generally designated as 164. Some of the subsystems shown in FIG. 1 perform communication-related functions, whereas other subsystems may provide "resident" or on-device functions. Notably, some subsystems, such as the keypad 154, the primary display 142, the secondary display 143, the clickable thumbwheel 160, and the trackball 160b for example, may be used for both communication-related functions, such as displaying notifications or entering a text message for transmission over the wireless network 104, and executing device-resident functions such as a clock, a calculator or a task list. Operating system software used by the microprocessor 140 is preferably stored in a persistent store such as the flash memory 144, which may alternatively be the ROM 148 or similar storage element. Those skilled in the art will appreciate that the operating system, specific device applications, or parts thereof, may be temporarily loaded into a volatile store such as the RAM 146.

The microprocessor 140, in addition to its operating system functions, enables execution of software applications on the wireless device 102. A predetermined set of applications that control basic device operations, including data and voice communication applications, will normally be installed on the wireless device 102 during or after manufacture. The wireless device 102 may include a personal information manager (PIM) application having the ability to organize and manage data items relating to a user such as, but not limited to, instant messaging, email, calendar events, voice mails, appointments, and task items. One or more memory stores may be available on the wireless device 102 to facilitate storage of information, such as the flash memory 144, the RAM 146, the ROM 148, the memory module 130, or other types of memory storage devices or FLASH memory cards represented by the other device subsystems 164, such as Secure Digital (SD) cards or mini SD cards, etc.

The PIM and/or media applications have the ability to send and receive data items via either the wireless network 104 or a link to a computer system. The link to the computer system may be via the serial port 152 or the short-range communications subsystem 162. In an embodiment, PIM and/or media data items are seamlessly combined, synchronized, and updated via the wireless network 104, with the wireless device user's corresponding data items stored and/or associated with a host computer system thereby creating a mirrored or partially mirrored host computer on the wireless device 102 with respect to such items. This may be advantageous where the host computer system is the wireless device user's office computer system. Additional applications may also be loaded onto the wireless device 102 through the wireless network 104, the auxiliary I/O subsystem 150, the serial port 152, the short-range communications subsystem 162, or any other suitable subsystem 164, and installed by a user in the RAM 146 or a non-volatile store such as the ROM 148 for execution by the microprocessor 140. Such flexibility in application installation may increase the functionality of the wireless device 102 and may provide enhanced on-device functions, communication-related functions, or both. For example, secure communication applications may enable electronic commerce functions and other such financial transactions to be performed using the wireless device 102.

In a data communication mode, a received data signal representing information such as a text message, an email message, a media file to be transferred, or Web page download will be processed by the communication subsystem 112 and input to the microprocessor 140. The microprocessor 140 will further process the signal for output to the primary display 142, secondary display 143, or alternatively to the auxiliary I/O device 150. A user of the wireless device 102 may also compose data items, such as email messages, for example, using the keypad 154 and/or the trackball 160b in conjunction with the primary display 142 and possibly the auxiliary I/O device 150. The keypad 154 may be either a complete alphanumeric keypad or telephone-type keypad. These composed items may be transmitted through the communication subsystem 112 over the wireless network 104 or via the short range communication subsystem 162.

For voice communications, the overall operation of the wireless device 102 is similar, except that the received signals would be output to the speaker or audio port 156 and signals for transmission would be generated by a transducer such as the microphone 158. Alternative voice or audio I/O subsystems, such as a voice message recording subsystem, may also be implemented on the wireless device 102. Although voice or audio signal output is typically accomplished primarily through the speaker or audio port 156, the primary display 142 or the secondary display 143 may also be used to provide an indication of the identity of a calling party, duration of a voice call, or other voice call related information. Stereo headphones or an earpiece may also be used in place of the speaker 156.

The serial port 152 is normally implemented in a personal digital assistant (PDA) type communication device for which synchronization with a user's computer is a desirable, albeit optional, component. The serial port 152 enables a user to set preferences through an external device or software application and extends the capabilities of the wireless device 102 by providing for information or software downloads to the wireless device 102 other than through the wireless network 104. The alternate download path may, for example, be used to load software or data files onto the wireless device 102 through a direct, reliable and trusted connection.

The short-range communications subsystem 162 is an additional optional component which provides for communication between the wireless device 102 and different systems or devices, which need not necessarily be similar devices. For example, the subsystem 162 may include an infrared device and associated circuits and components, or a wireless bus protocol compliant communication mechanism such as a Bluetooth™ communication module to provide for communication with similarly-enabled systems and devices (Bluetooth™ is a registered trademark of Bluetooth SIG, Inc.). In another embodiment, the short-range communications subsystem 162 may be a wireless networking communications subsystem, conforming to IEEE 802.11 standards such as one or more of 802.11b, 802.11g, or 802.11n.

Figure 2:
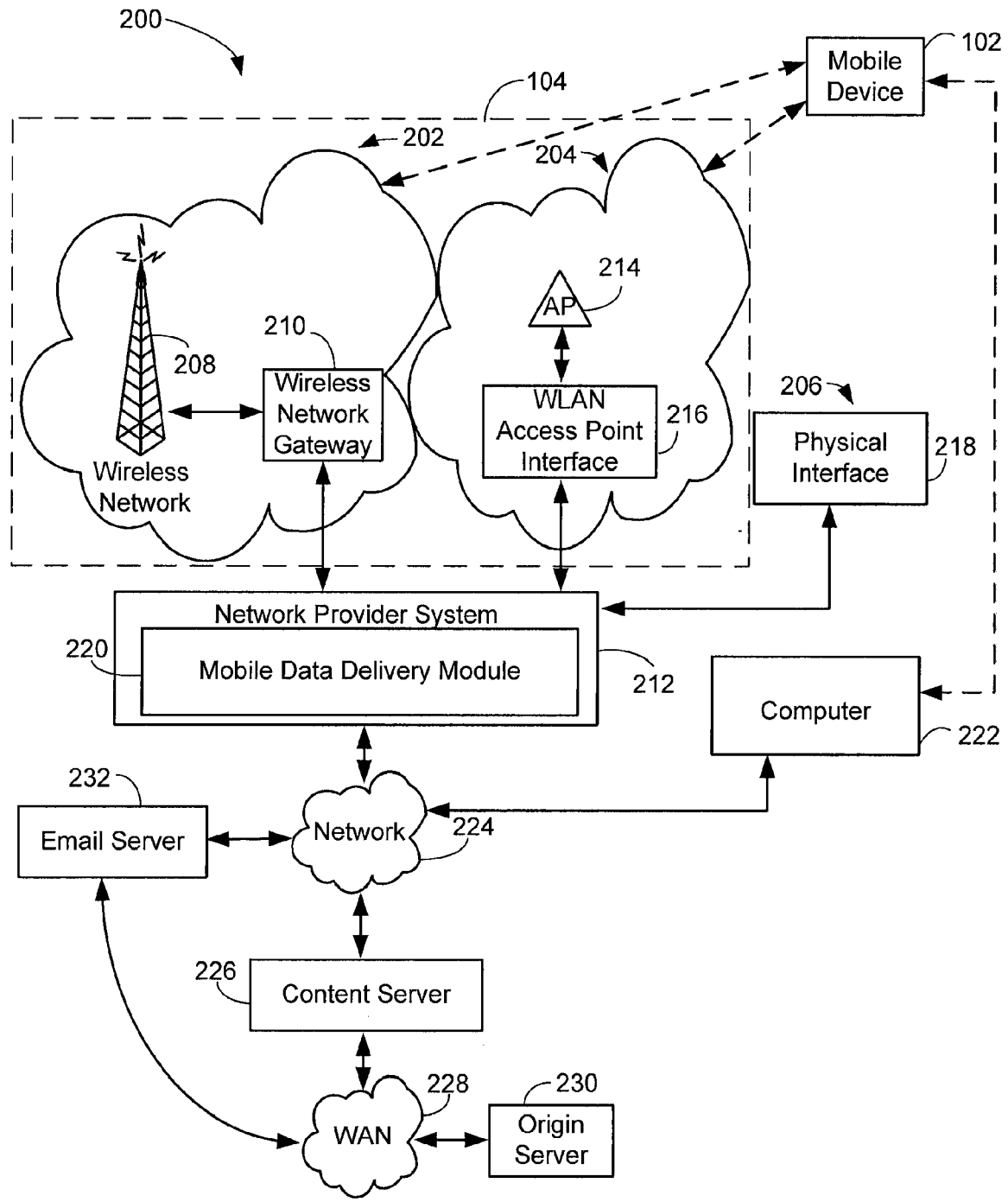
FIG. 2 shows in block diagram form a communication system suitable for providing the operating environment of the handheld device of FIG. 1 in accordance with an embodiment.

Reference is next made to FIG. 2, which shows a communication system 200 suitable for use with the wireless device 102 shown in FIG. 1. The communication system 200 generally includes one or more wireless devices 102 (only one of which is shown in FIG. 2) and the wireless network 104. The wireless network 104 may include a wireless Wide Area Network (WAN) 202, a Wireless Local Area Network (WLAN) 204, and/or other interfaces 206 (which may not necessarily be wireless).

Referring to FIG. 2, the wireless WAN 202 may be implemented as a packet-based cellular or mobile network that includes a number of base stations 208 (one of which is shown in FIG. 2) where each of the base stations 208 provides wireless Radio Frequency (RF) coverage to a corresponding area or cell. The wireless WAN 202 is typically operated by a cellular network service provider that sells subscription packages to users of the wireless devices 102. The wireless WAN 202 comprises a number of different types of networks, for example, Mobitex Radio Network, DataTAC, GSM (Global System for Mobile Communication), GPRS (General Packet Radio System), TDMA (Time Division Multiple Access), CDMA (Code Division Multiple Access), CDPD (Cellular Digital Packet Data), iDEN (integrated Digital Enhanced Network) or various other third generation networks such as EDGE (Enhanced Data rates for GSM Evolution), UMTS (Universal Mobile Telecommunications Systems), or Evolution-Data Optimized (EV-DO).

As shown in FIG. 2, the communications system 200 also includes a wireless network gateway 210 and one or more network provider systems 212. The wireless network gateway 210 provides translation and routing services between the network provider system(s) 212 and the WAN 202, which facilitates communication between the wireless devices 102 and other devices (not shown) connected, directly or indirectly, to the network provider system 212.

The WLAN 204 comprises a network which in some examples conforms to IEEE 802.11 standards such as one or more of 802.11b, 802.11g, or 802.11n; however, other communications protocols may also be used for the WLAN 204. The WLAN 204 includes one or more wireless RF Access Points (AP) 214 (one of which is shown in FIG. 2) that collectively provide a WLAN coverage area. For the embodiment depicted in FIG. 2, the WLAN 204 is operated by an enterprise (for example, a business or university in a building or campus type environment) and the access points 214 are connected to an access point (AP) interface 216. The AP interface 216 provides translation and routing services between the access points 214 and the network provider system 212 to facilitate communication between two or more of the wireless devices 102 and other devices (e.g., such as desktop computers) connected, directly or indirectly, to the network provider system 212. The AP interface 216 is implemented using a computer, for example, a server running a suitable computer program or software.

According to an embodiment, the other interfaces 206 may be implemented using a physical interface indicated by reference 218. The physical interface 218 includes an Ethernet, Universal Serial Bus (USB), Firewire, or infrared (IR) connection implemented to exchange information between the network provider system 212 and the wireless device 102.

The network provider system 212 comprises a server or server modules or a number of servers or server modules which are typically located behind a firewall (not shown). The network provider system 212 may include a number of modules including a mobile data delivery module 220. Various modules running on the network provider system 212 may be implemented as a number of services running on a single server or as a number of interconnected servers each running a software program to implement the functionality of the respective module. The network provider system 212 provides access for the wireless devices 102, through either the wireless WAN 202, the WLAN 204, or the other connection 206 to the devices connected, for example, through an enterprise network 224 (e.g., an intranet), to the network provider system 212. In an embodiment, the data delivery module 220 is implemented on a computer, such as the network provider system 212.

The enterprise network 224 comprises a local area network, an intranet, the Internet, a direct connection, or combinations thereof. The enterprise network 224 may comprise an intranet for a corporation or other type of organization. In at least some embodiments, the network provider system 212 is part of the enterprise network 224, and is located behind a corporate firewall and connected to the wireless network gateway 210 through the Internet. A computer 222 (e.g., a desktop or laptop computer) belonging to the user of the wireless device 102 is typically connected to the enterprise network 224. As described earlier, the wireless device 102 can be temporarily and directly connected to the computer 222 using, for example, the serial port 152. Alternatively, the wireless device 102 may communicate with the computer 222 using the communication subsystem 112 and the WAN 202 and/or the short-range communications subsystem 162 and the WLAN 204.

As shown in FIG. 2, an application/content server 226 may be connected to the enterprise network 224 and also to another network, for example a Wide Area Network (WAN) 228. In some embodiments, an email server 232 and/or the content server 226 form part of the enterprise network 224. The WAN 228 may further connect to other networks. The WAN 228 may comprise or be configured with the Internet, a direct connection, a LAN, a wireless communication link, or any combination thereof. Content providers, such as Web servers, may be connected to the WAN 228, an example of which is shown in FIG. 2 as an origin server 230.

According to an embodiment, the mobile data delivery module 220 provides connectivity between the wireless WAN 202 and the WLAN 204 and the other connection 206 and devices and/or networks connected directly or indirectly to the network provider system 212. In an embodiment, the connectivity provided may be Hypertext Transfer Protocol (HTTP) based connectivity providing an Internet based service connection to devices connected to the wireless WAN 202, the WLAN 204, or the other connection 206 and devices and/or networks connected directly or indirectly to the network provider system 212. The network 224, the application/content server 226, the WAN 228, and the origin server 230, are individually and/or collectively in various combinations a content source for the network provider system 212. It will be appreciated that the system shown in FIG. 2 comprises but one possible communication network or configuration of a multitude of possible configurations for use with the wireless devices 102.

Figure 3:
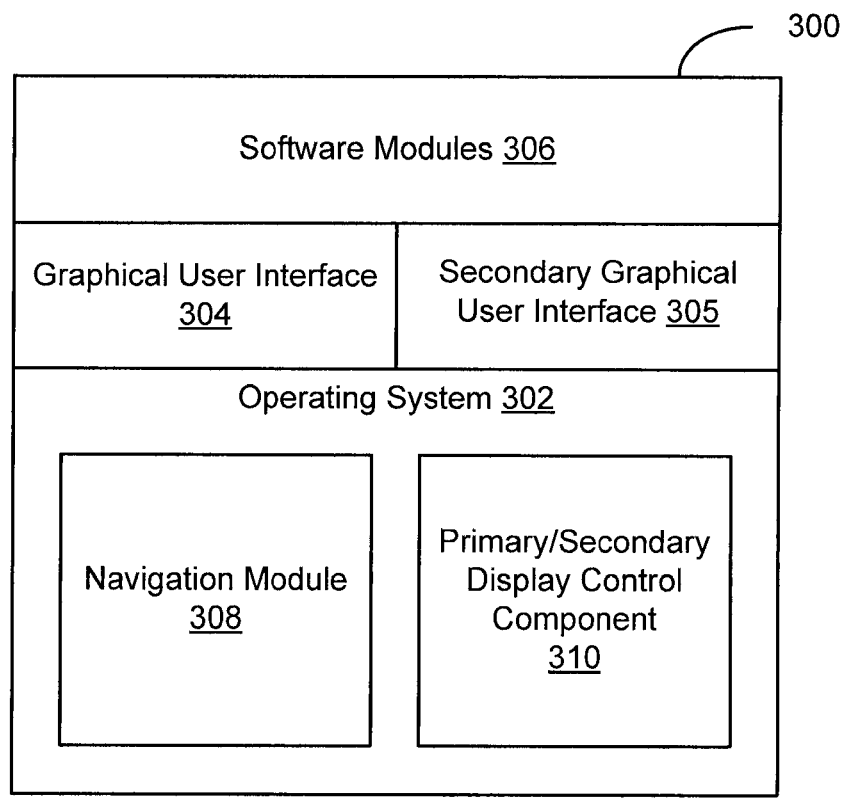
FIG. 3 shows in block diagram form the contents of a memory of the handheld device of FIG. 1.

Reference is next made to FIG. 3, which shows a block diagram illustrating a memory 300 of the wireless device 102. The memory 300 has various software components for controlling the wireless device 102 and may include, for example, the flash memory 144, the RAM 146, the ROM 148, the memory module 130 and/or the other device subsystems 164. In accordance with an embodiment, the wireless device 102 is intended to be a multi-tasking mobile communication device for sending and receiving data items, such as instant messages, for making and receiving voice calls, and for creating events and alerts. To provide a user-friendly environment to control the operation of the wireless device 102, an operating system (OS) 302 resident on the wireless device 102 provides a basic set of operations for supporting various applications typically operable through a primary user interface such as a primary graphical user interface (GUI) 304, and may include a secondary user interface such as a secondary GUI 305 which may be displayed on the secondary display 143. Although the primary GUI 304 and the secondary GUI 305 are shown as separate components, the secondary GUI 305 may be a subcomponent of the primary GUI 304.

The OS may also comprise a primary/secondary display control component 310 for controlling the primary display 142 and the secondary display 143. For example, the operating system 302 provides basic input/output system features to obtain input from the auxiliary I/O 150, the keypad 154, the clickable thumbwheel 160, the trackball 160b, and other input devices, and to facilitate output to the user via at least one of the primary display 142 and the secondary display 143. The OS may comprise a navigation module 308 for processing navigation input received from the navigation buttons on the device. The primary GUI 304 and the secondary GUI 305 are typically components of the OS 302. One or more software modules 306 for managing communications or providing a personal digital assistant (PDA) or other functions may also be included.

The memory 300 also includes an email and calendar client, which may be combined in, for example, a PIM application having email-based calendaring and scheduling functions. Typically, the PIM is installed as one of the software modules 306. The navigation module 308 may be included among the software modules 306. Thus, the wireless device 102 includes computer executable programmed instructions for directing the wireless device 102 to implement various applications. The programmed instructions may be embodied in the one or more software modules 306 resident in the memory 300 of the wireless device 102. Alternatively, the programmed instructions may be tangibly embodied on a computer readable medium (such as a DVD, CD, floppy disk or other storage media) which may be used for transporting the programmed instructions to the memory 300 of the wireless device 102. Alternatively, the programmed instructions may be embedded in a computer-readable, signal-bearing medium that is uploaded to the wireless network 104 by a vendor or supplier of the programmed instructions, and this signal-bearing medium may be downloaded through one or more of the interfaces 112, 150, 152, 162 to the wireless device 102 from, for example, the wireless network 104 by end users.

Figure 4A:
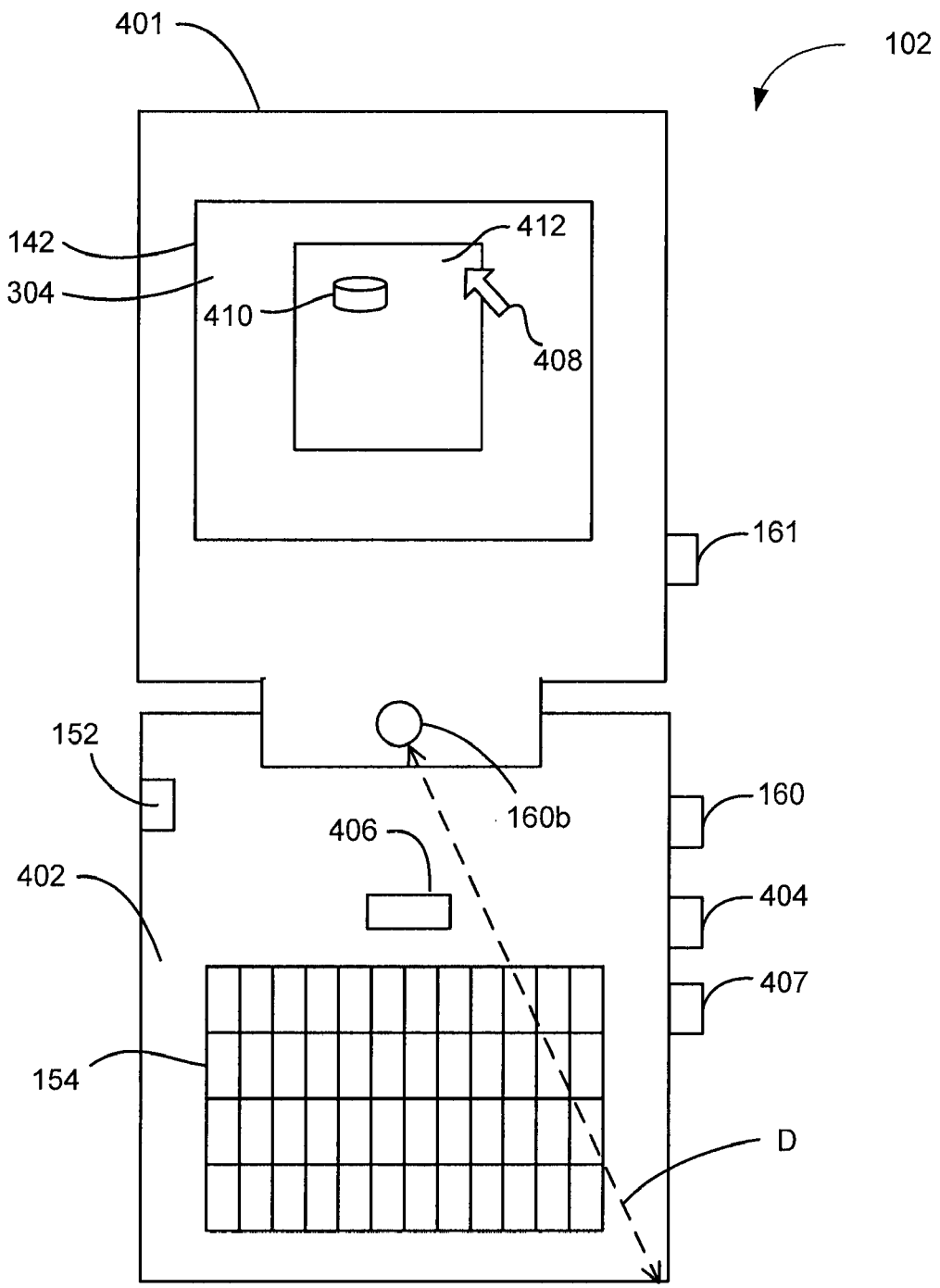
FIG. 4A is a front view illustrating the handheld device of FIG. 1 with a non-flush general navigation button in an opened configuration, in accordance with an embodiment.
Figure 4B:
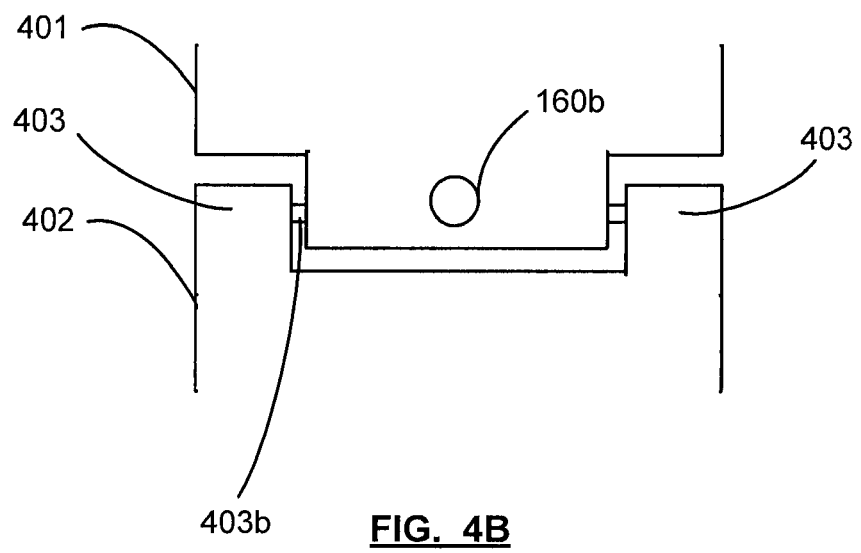
FIG. 4B is an enlarged view of a section of the handheld device of FIG. 4A, showing a rotatable coupling.

Reference is now made to FIGS. 4A and 4B, which show a front view of an embodiment of a handheld device, in this case a wireless device 102 that facilitates non-flush general navigation buttons, in an opened configuration. FIG. 4B is an enlarged view of a portion of the wireless device 102, illustrating an example of a rotatable coupling. In the shown embodiment, the wireless device 102 is a clamshell mobile communication device. As mentioned above, the wireless device 102 may be a data and voice-enabled handheld device. The wireless device 102 includes the primary display 142 that may be visible when the wireless device 102 is in an opened configuration, and the secondary display 143 (FIG. 5A) that may be visible when the wireless device 102 is in a closed configuration.

The wireless device 102 includes a first portion such as a lid 401, a second portion such as a lower casing 402, the data or serial port 152, the primary display 142 and the secondary display 143 (FIG. 5A), which displays the primary GUI 304 and the secondary GUI 305, respectively, the keypad 154, the clickable thumbwheel 160, a protruding navigation button such as a joystick, a rocker button, or a trackball 160b, one or more input buttons 404 (e.g., select, cancel, talk buttons), signal inputs/outputs 406 (e.g., power connector input, microphone, speaker, data interface input, etc.), and an audio port 407.

The lid 401 and the lower casing 402 may be rotatably coupled such that the two are rotatable relative to each other about an axis of rotation, such as in a hinge coupling. This allows the wireless device 102 to be movable between an opened configuration (e.g., when the lid 401 and the lower casing 402 are rotated apart) and a closed configuration (e.g., when the lid 401 and the lower casing 402 are rotated together). In the example shown in FIG. 4B, the lid 401 is received in a pair of coupling portions 403 on the lower casing 402, with a pin 403b connecting the lid 401 and the lower casing 402 to enable a rotatable coupling between the lid 401 and the lower casing 402. Although the coupling portions 403 are shown as being on the lower casing 402, the coupling portions may instead be on the lid 401. Typically, if the lower casing 402 has the coupling portions 403, then the trackball 160b is disposed on the lid 401 and vice versa. Other rotatable coupling mechanisms may also be possible. There may be more or less coupling portions 403. There may be receptacles or bearings in the coupling portions 403 for receiving the pin 403b and to facilitate easy rotation about the pin 403b. A hinge may be provided between the ends of the lid 401 and the lower casing 402 instead of the lid 401 being received between coupling portions 403. The lid 401 and the lower casing 402 may be prevented from opening too far apart, for example by including stops on the coupling portions 403, or by a portion of the lid 401 abutting against the lower casing 402 when the lid 401 is opened. Typically, the lid 401 and the lower casing 402 may be rotated to no more than about 180 degrees apart.

Although the wireless device 102 is shown with the primary display 142 being on the inside of the lid 401, the primary display 142 may also be on the lower casing 402 or in any other suitable location. Although the wireless device 102 is shown as having a selection button 161, the clickable thumbwheel 160 or trackball 160b, which may be a clickable trackball, may be used instead, and all discussion of the selection button 161 will be understood to apply equally to the clickable thumbwheel 160 or trackball 160b. Where the device includes a trackball 160b, the clickable thumbwheel 160 and/or the selection button 161 may be omitted. Internally, the wireless device 102 includes one or more circuit boards (not shown), the microprocessor 140 (FIG. 1), the memory 300 (FIG. 3), the battery 138 (FIG. 1), the antennae 118, 120 (FIG. 1), etc., which may all be coupled to the signal inputs/outputs 406, the keypad 154, the primary display 142, the secondary display 143, the clickable thumbwheel 160, the trackball 160b, etc.

The microprocessor 140 is typically coupled to one or more input devices (e.g., the buttons 404, the keypad 154, the clickable thumbwheel 160, the trackball 160b) for receiving user commands, selections or queries, and the primary display 142 and the secondary display 143 for displaying the results of these commands or queries. For example, user queries may be transformed into a combination of commands for producing one or more tables of output data which may be incorporated in one or more display pages for presentation to the user. In another example, user selections may be transformed into a command for displaying a preview of the selection on the primary display 142 or the secondary display 143. The microprocessor 140 is also coupled to the memory 300.

Although the wireless device 102 is shown as having a separate primary display 142 and secondary display 143 for showing the primary GUI 304 and the secondary GUI 305 respectively, it should be understood that a single display may instead be used. For example, the lid 401 may have an opening or a transparent portion through which a single display on the lower casing 402 is visible when the wireless device 102 is closed. Such a display may show the primary GUI 304 when the wireless device 102 is open, and may change to show the secondary GUI 305 when the wireless device 102 is closed. Other such variations may be possible.

A user may interact with the wireless device 102 and its software modules 306 using the primary GUI 304 and the secondary GUI 305. The following description refers to the primary GUI 304 for simplicity, but all references to the primary GUI 304 are equally applicable to the secondary GUI 305. The primary GUI 304 is controlled by the operating system 302 (FIG. 3) and provides a display format providing information to the user, or enabling the user to choose commands, execute application programs, manage computer files, and perform other functions by selecting pictorial representations (e.g., icons), or selecting items from a menu through the use of an input or pointing device such as the clickable thumbwheel 160, the trackball 160b, or the keypad 154. Generally, the primary GUI 304 is used to convey information and receive commands from users and includes a variety of GUI objects or controls including icons, toolbars, drop-down menus, pop-up menus, text, dialog boxes, buttons, etc. A user typically interacts with the primary GUI 304 presented on the display 142 by using an input or pointing device, such as the trackball 160b, to position a pointer or cursor 408 over an object 410 (i.e., "pointing" at the object) and by "clicking" on the object 410 (e.g., by depressing the trackball 160b or pressing a button on the keyboard 154, etc.). This is often referred to as a point-and-click or selection operation. Typically, the object 410 may be highlighted (e.g., shaded) when it is selected or pointed at by the pointer or cursor 408 to indicate that the object 410 is selectable. The secondary GUI 305 may present a simplified user interface, and may provide limited user interaction compared to the primary GUI 304.

Typically, a GUI-based system presents application, status, and other information to the user on the primary display 142 and the secondary display 143. The primary GUI 304 may provide for a full user interface whereas the secondary GUI 305 may provide a condensed or simplified user interface. For example, the primary GUI 304 may provide a window 412, which is a display area shown within the primary display 142, typically rectangular, in which a user may view an application or document. The window 412 may be open, closed, displayed full screen, reduced to an icon, increased or reduced in size, or moved to different areas of the display 142. Multiple windows 412 may be displayed simultaneously. For example, the windows 412 may be displayed within other windows, overlapped with other windows, or tiled within the display area. The secondary GUI 305 may also provide a window 412, or it may provide a simplified user interface without the use of a window 412.

As seen in FIG. 4, the trackball 160b, or other similar protruding navigation button such as a joystick or a rocker button, may be coupled to or disposed on the lid 401. Although not shown, the trackball 160b may alternatively be disposed on the lower casing 402. For simplicity, the trackball 160b will be described as being disposed on the lid 401. A person skilled in the art would understand that the description of the trackball 160b being disposed on the lid 401 would also apply, in a mirrored fashion, for a trackball 160b being disposed on the lower casing 402.

The lid 401 and the lower casing 402 are rotatably coupled such that they are rotatable relative to each other about an axis of rotation. The trackball 160b may be disposed such that it is centered on the axis of rotation. Alternatively, the trackball 160b may be offset or spaced apart from this axis of rotation. Typically, the trackball 160b is offset or spaced apart such that it is still accessible by a user's thumb when the device 102 is held in one hand. In typical usage, the lower corner of the device 102 may rest against a lower edge of the user's palm or the muscle of the user's thumb while the user's thumb wraps around the device 102 to access the trackball 160b. Thus, the distance D typically is within a range matching the distance from the ball of the user's thumb to the base of the thumb muscle, that is, the reach distance of the user's thumb, such that the trackball 160b is within a comfortable reach of the thumb. This distance D may range from about 6 cm to about 10 cm, but may depend on the intended user—for example, this distance may be less where the intended user is a small child with a smaller hand.

Although the trackball 160b is described, other similar general navigation buttons may be used. Other suitable navigation buttons include a joystick or a rocker button. Such general navigation buttons typically provide the user with navigation in more than one dimension using only a single button, and navigation may not be limited to the Cartesian directions. This may simplify navigation in the GUI 304 and/or 305, by allowing full navigation using only one button, thus improving the user experience. Such navigation buttons typically are more easily accessible and more usable when protruding at least a few millimeters from the surface on which it is disposed. Typically, this protrusion may range from about 1mm to about 2mm. It would be understood by a person skilled in the art that references to the trackball 160b also apply to other similar general navigation buttons.

In the opened configuration, the trackball 160b is accessible by the user's finger and/or thumb. The trackball 160b is disposed such that it is exposed when the wireless device 102 is closed, making it accessible for manipulation, for example by a user's forefinger. That is, the trackball 160b is not enclosed between the lid 401 and the lower casing 402 when the device 102 is closed, but rather flips outwards, as will be clear with reference to FIGS. 5A-5C below. Since the user's thumb and forefinger are opposable when cradling or holding the device 102, the trackball 160b is conveniently accessible by the thumb when the device 102 is opened and by the forefinger when the device 102 is closed. Since the trackball 160b is not enclosed when the device 102 is closed, the trackball 160b does not need to be flush with the lower casing 402 or the lid 401 in order to avoid being compressed when the device is closed, nor is a depression in the lower casing 402 or the lid 401 necessary to accommodate the protruding trackball 160b. Because the trackball 160b is not flush with the lower casing 402 or set into a depression, the trackball 160b may be easily accessed even by users having very large fingers. Further, because the device 102 does not need to accommodate the trackball 160b within the lid 401 and lower casing 402 in the closed configuration, the device 102 may be made to be thinner.

Figure 5A:
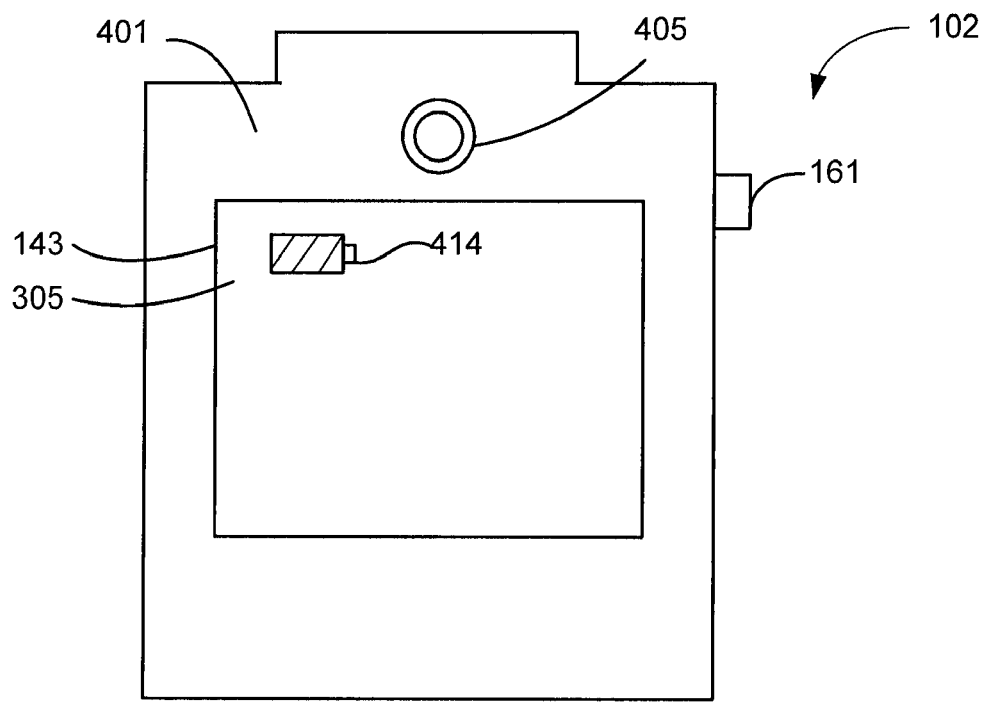
FIG. 5A is a front view illustrating the handheld device of FIG. 4A in a closed configuration.
Figure 5B:
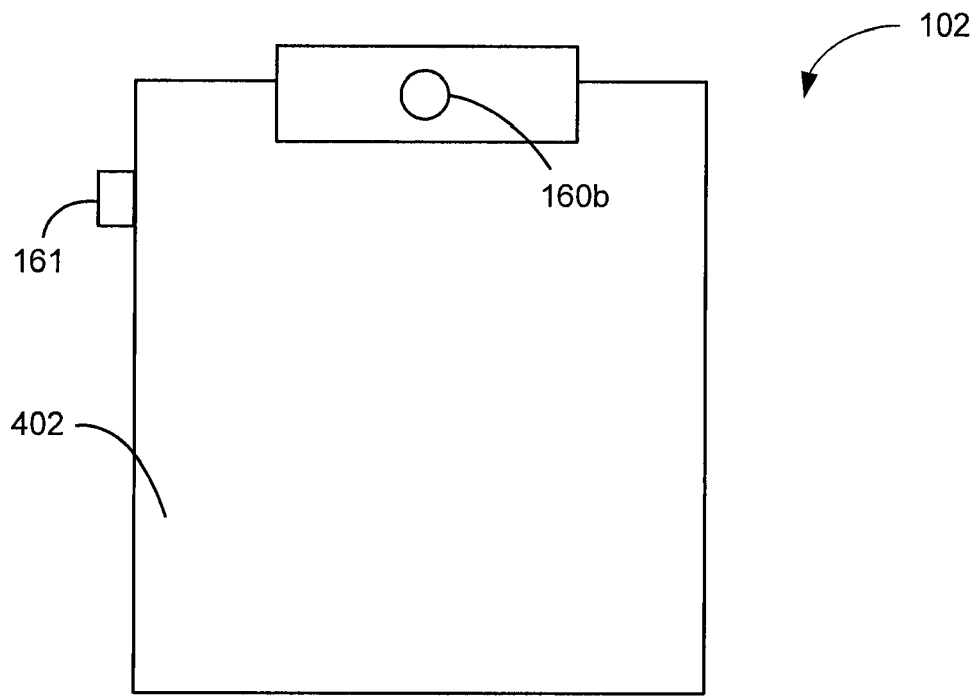
FIG. 5B is a back view illustrating the handheld device of FIG. 4A in a closed configuration.
Figure 5C:
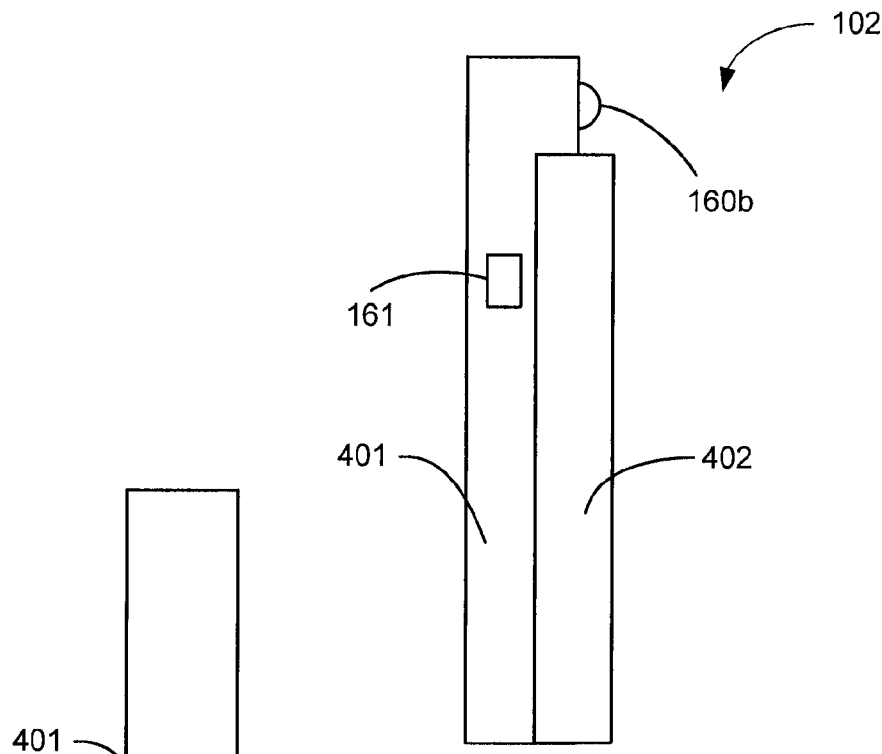
FIG. 5C is a side view illustrating the handheld device of FIG. 4A in a closed configuration.

Reference is now made to FIGS. 5A-5C, which show an embodiment of a handheld device, in this case a wireless device 102, that facilitates non-flush general navigation buttons, in a closed configuration. FIG. 5A shows the device in a front view; FIG. 5B shows the device in a back view; and FIG. 5C shows the device in a side view. For simplicity, input button 404 and audio port 407 have been omitted from these views, but may be included in some embodiments.

The front view (FIG. 5A) of the closed wireless device 102 shows a lid 401, having the secondary display 143. The lid 401 may also include secondary navigation tools such as a selection button 161 and other features such as a camera lens 405. The secondary display 143 typically displays the secondary GUI 305. The secondary GUI 305 has been simplified for the purpose of illustration, but may include all the features described with respect to the primary GUI 304 in some embodiments. In this example, the trackball 160b is disposed on the lid 401. When the wireless device 102 is closed, the trackball 160b, being disposed at or near the axis of rotation of the rotatable coupling connecting the lid 401 and the lower casing 402, is rotated and flipped to the back of the device. Hence, the trackball 160b is not visible in the front view (FIG. 5A). From the back view (FIG. 5B), the lower casing 402 of the wireless device 102 is visible. The trackball 160b is also visible. When the device 102 is closed, trackball 160b is flipped such that the trackball 160b is exposed and accessible, facing outwards from the device 102. As seen in the side view (FIG. 5C), the trackball 160b may protrude from the surface on which it is disposed, outwards from the back of the device 102. Because the trackball 160b is flipped outwards and is exposed, there is no need to mount the trackball 160b flush with the surface on which it is disposed.

It would be understood that where the trackball 160b is instead disposed on the lower casing 402, the trackball 160b would flip to face outwards from the front of the wireless device 102. That is, the trackball 160b would be visible in the front view and not visible in the back view.

Since the trackball 160b is not enclosed within the lid 401 and the lower casing 402 when the wireless device 102 is closed, there is no need to include any depression or bevel in the lid 401 or lower casing 402 to accommodate the protrusion of the trackball 160b. The resultant space savings is not insignificant, as the trackball 160b and similar protruding navigation buttons may require a protrusion of at least a few millimeters in order to be accessible and useful to the user. As such, the thickness of the device 102 may be decreased by the disclosed configuration.

By providing the trackball 160b on the exterior of the wireless device 102 when the device 102 is closed, this configuration also allows the user to access the trackball 160b when the device 102 is closed. When cradling or holding the device 102, the user's thumb and finger are opposable. The trackball 160b is thus conveniently located in both the opened and closed configurations, matching the hand's relaxed posture. The trackball 160b may then be used to navigate the secondary GUI 305 shown on the secondary display 143. This avoids the need to provide a second navigation button, for example on the outer surface of the lid 401, for use when the device 102 is closed, thus simplifying the design of the device 102, which may save on cost and complexity of manufacture.

Figure 5D:
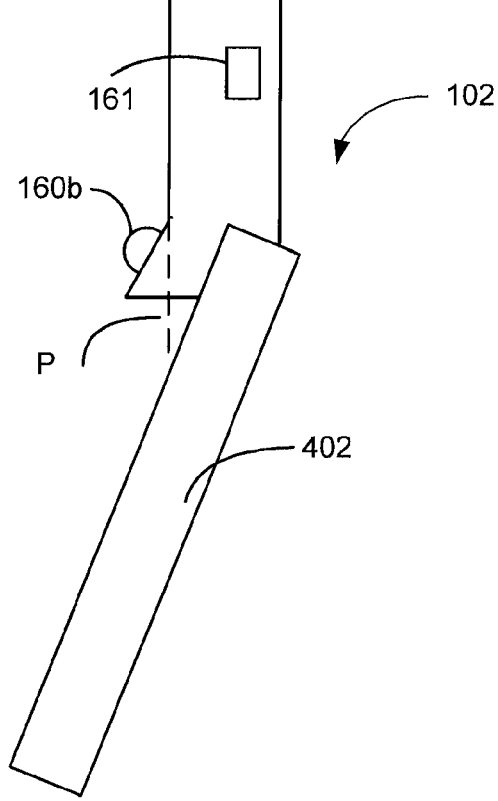
FIG. 5D is a side view illustrating a handheld device that may be configured to facilitate non-flush general navigation buttons, having an angled navigation button, in an opened configuration, in accordance with an embodiment of the disclosure.
Figure 5E:
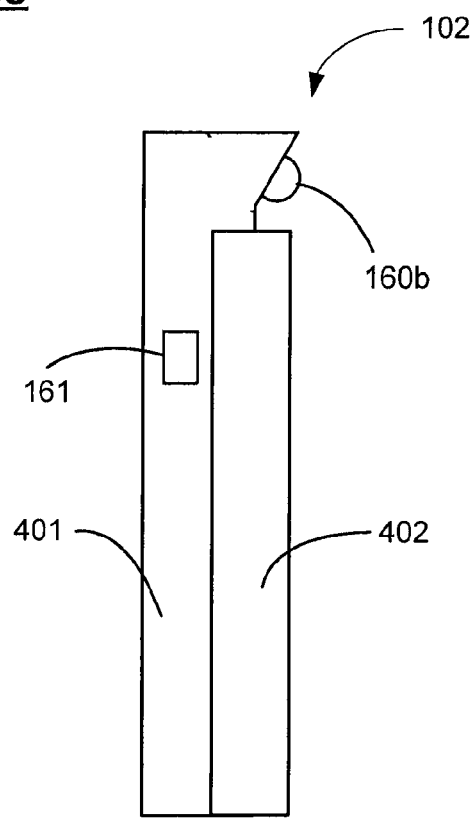
FIG. 5E is a side view illustrating the handheld device of FIG. 5D in a closed configuration.
Figure 5F:
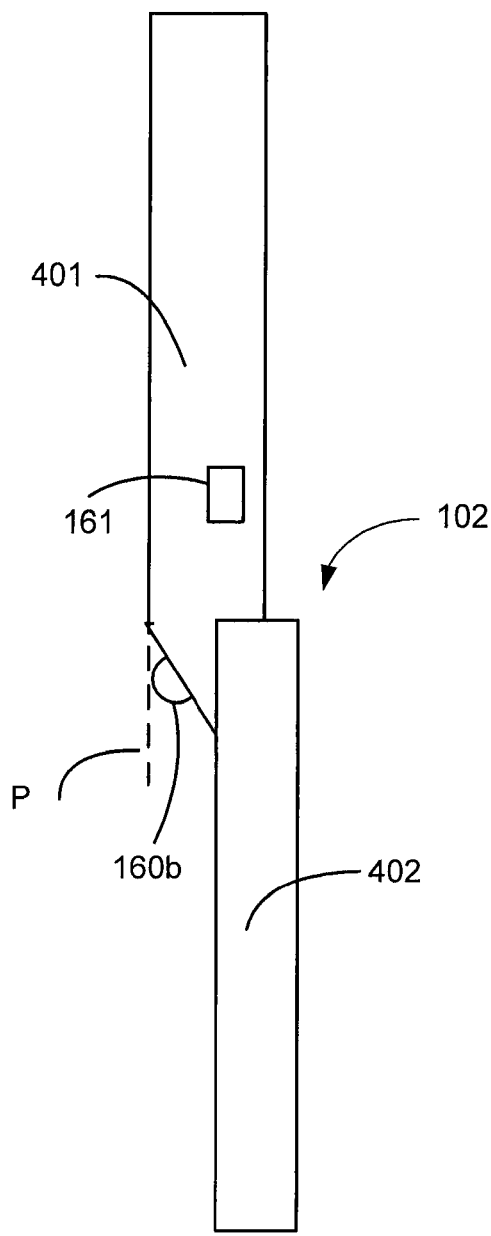
FIG. 5F is a side view illustrating a handheld device that may be configured to facilitate non-flush general navigation buttons, having a differently angled navigation button, in an opened configuration, in accordance with an embodiment of the disclosure.
Figure 5G:
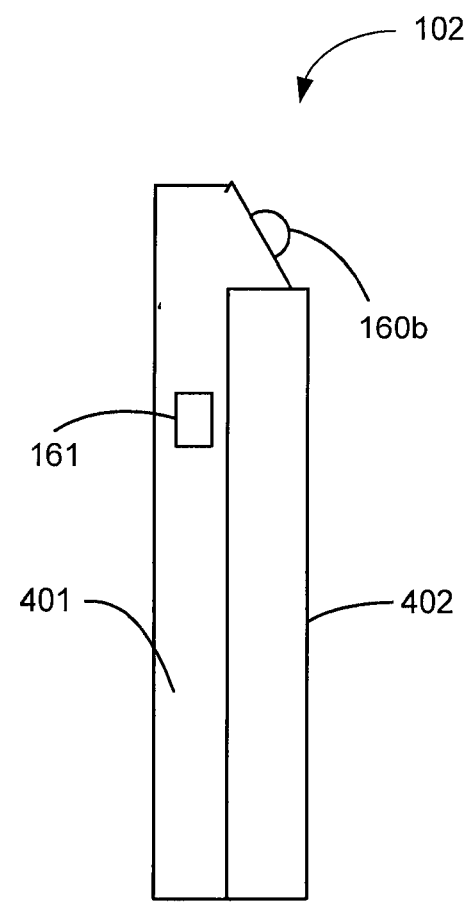
FIG. 5G is a side view illustrating the handheld device of FIG. 5F in a closed configuration.

FIGS. 5D and 5E show an embodiment in which the trackball 160b is angled for easier access. The trackball 160b may be disposed angled slightly upwards when the wireless device 102 is in the opened configuration, and angled slightly downwards when the wireless device 102 is in the closed configuration. In the opened configuration, the upward angle may match the angle between the lid 401 and the lower casing 402, such that the trackball 160b is provided on a surface approximately parallel to the lower casing 402. This may increase the ease with which the user may access the trackball 160b in both the opened and the closed configurations. As shown, this may be accomplished by angling the surface on which the trackball 160b is disposed relative to the general plane P of the lid 401 (in the case where the trackball 160b is disposed on the lid 401). Alternatively, the trackball 160b itself may protrude from the surface at an angle such that a central axis through the center of the trackball 160b is angled relative to the surface on which the trackball 160b is disposed or the general plane P. It would be understood by a person skilled in the art that although the lid 401 is described as having a general plane, the lid 401 is not necessarily planar, and the general plane may be an approximation of the surface of the lid 401. Similarly, where the trackball 160b is disposed on the lower casing 402, the trackball 160b may be angled relative to the general plane of the lower casing 402. FIGS. 5F and 5G show an embodiment in which the trackball 160b is similarly angled for easier access, but at a different angle. In this embodiment, the trackball 160b is disposed angled slightly downwards when the wireless device 102 is in the opened configuration; and angled slightly upwards when the wireless device 102 is in the closed configuration, matching the curve of a user's forefinger when the device 102 is held in a relaxed hand.

Where the trackball 160b is disposed on the lid 401, the trackball 160b is flipped to the back of the device 102 in the closed configuration. Hence, the trackball 160b may be easily accessed by an index finger of the user when the device 102 is held in the palm of the hand. Conversely, where the trackball 160b is disposed on the lower casing 402, the trackball 160b is flipped to the front of the device 102 in the closed configuration, where it may be easily accessed by a thumb of the user when the device 102 is held in the palm of the hand.

Figure 6:
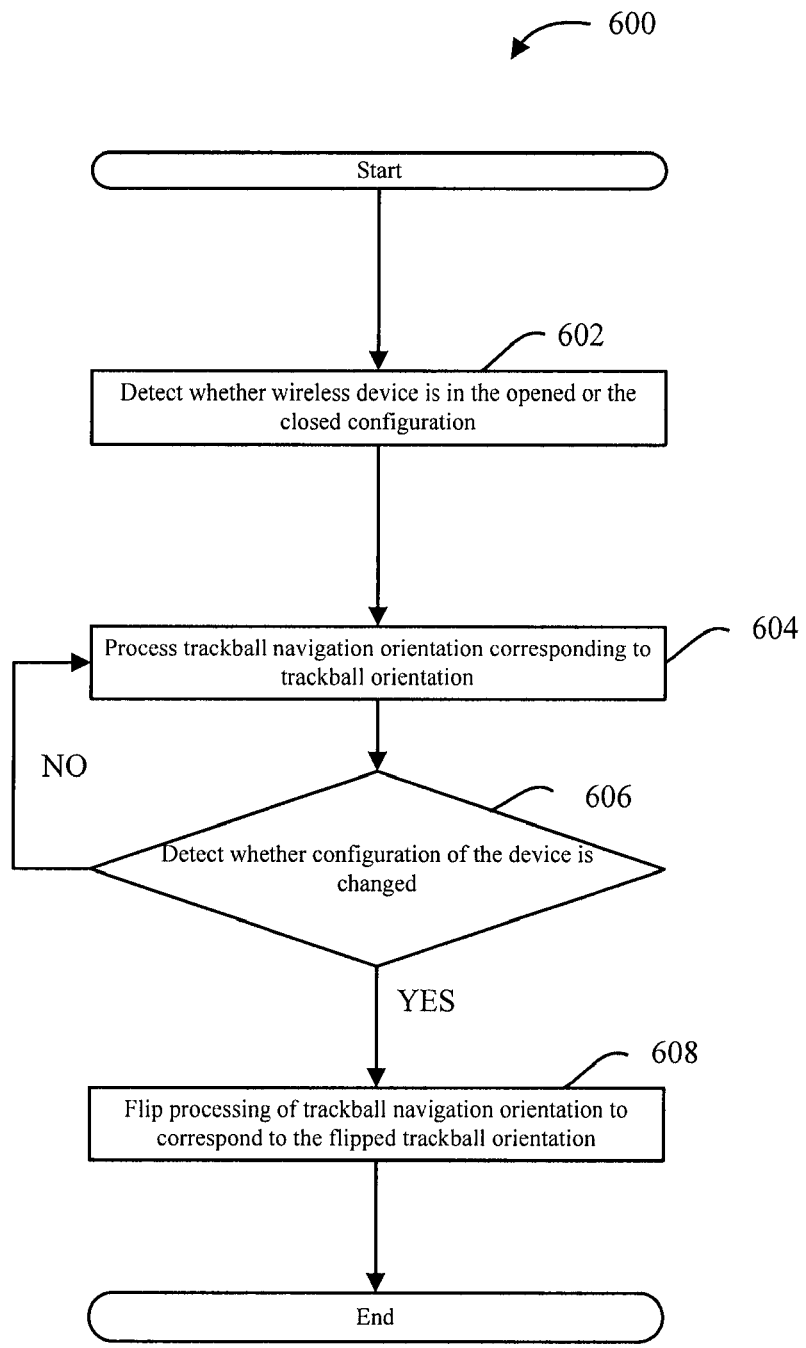
FIG. 6 is a flowchart illustrating a method of facilitating navigation using a non-flush navigation button in accordance with an embodiment of the disclosure.

Reference is now made to FIG. 6, which is a flowchart illustrating a method 600 using the non-flush general navigation button in accordance with an embodiment of the disclosure.

Method 600 allows the navigation orientation of the trackball 160b to be changed depending on whether the wireless device 102 is in the opened or the closed configuration. As described above, when the device 102 is closed, the trackball 160b is flipped over to face outwards from the device 102. This means that in the closed configuration, the trackball 160b is actually upside down compared to its orientation in the opened configuration. Accordingly, the navigation orientation of the trackball 160b must also be flipped when the trackball 160 is flipped, so that, for example, a user pushing up on the trackball 160b is interpreted by the OS 302 as an input to navigate up in the GUI 304 and/or 305 regardless of whether the trackball 160b is flipped outwards or not. Typically, only the "up/down" navigation orientation of the trackball 160b will need to be flipped, and the "left/right" navigation orientation is unaffected.

For simplicity, the orientation of the trackball 160b when the wireless device 102 is in the opened configuration will be referred to as the primary trackball orientation and that of the closed configuration will be referred to as the secondary trackball orientation. The navigation module 308 processes navigation input received from the trackball 160b in either a primary navigation orientation or a secondary navigation orientation, corresponding to the respective trackball orientations. Such terminology is for ease of reference only and is not intended to indicate the relative importance or usefulness of either orientation.

At a step 602, the OS 302 detects whether the wireless device 102 is in the opened or the closed configuration. Typically, the OS 302 only detects whether the device 102 is in the fully opened or the fully closed configuration. That is, half-opened or half-closed configurations do not trigger any change in the navigation orientation of the trackball.

At a step 604, the navigation orientation of the trackball is processed by the navigation module 308 to correspond to the trackball orientation. That is, if the device 102 is in the opened configuration, then the trackball is in the primary trackball orientation. Accordingly, navigation using the trackball is processed using the primary navigation orientation, corresponding to the primary trackball orientation. Conversely, if the device 102 is in the closed configuration, then the trackball is in the secondary trackball orientation. Accordingly, navigation using the trackball is processed using the secondary navigation orientation.

At a step 606, the OS 302 detects whether the configuration of the wireless device 102 has changed. That is, whether the device 102 has changed from an opened to a closed configuration, or vice versa.

If the configuration of the wireless device 102 has not changed, then the trackball orientation and navigation orientation remains unchanged, and the method 600 returns to the step 604.

If the configuration of the wireless device 102 has changed, this means that the trackball 160b has flipped orientation. That is, the trackball 160b has flipped from a primary orientation to a secondary orientation where the device 102 has changed from an opened to a closed configuration, and vice versa. The method thus proceeds to a step 608.

At the step 608, the navigation orientation of the trackball is flipped to correspond to the trackball orientation. That is, where the trackball 160b was originally in the primary trackball orientation, the trackball 160b is now in the secondary trackball orientation. Accordingly, processing of trackball navigation is also flipped to the secondary navigation orientation. The opposite is true when changing from the secondary to the primary trackball orientation.

The method 600 thus ensures that the navigation module 308 always processes navigation input received from the trackball 160b in the correct orientation, regardless of whether the trackball 160b is flipped outwards or not.

Although the method 600 is concerned mainly with flipping the up/down navigation orientation of the trackball to accommodate the opened and closed configurations, the navigation orientation of the trackball may be adjusted in other ways to suit other device orientations. In an embodiment, the device 102 may include an accelerometer or a gyroscope, such that at the step 602 the OS 302 may additionally detect the orientation of the device—for example, whether the device is held upside-down or horizontally instead of vertically. Then, at the step 604, the navigation module 308 processes the navigation orientation of the trackball to correspond to the trackball orientation—that is, the navigation orientation may be rotated by 180 degrees where the OS 302 detects that the device has been turned upside down; or the navigation orientation may be rotated by 90 degrees where the OS 302 detects that the device is being held horizontally.

Similarly, at the steps 606 and 608, the OS 302 may additionally detect if the orientation of the device has changed and the navigation module 308 may change the navigation orientation accordingly.

While the steps of the method 600 are shown as occurring in a particular order, it will be appreciated by those skilled in the art that many of the steps are interchangeable and may occur in different orders than that shown without materially affecting the end results of the method 600. Additionally, while inputs of the general navigation button is described as principally being processed within the navigation module 308, it will be understood by those skilled in the art that a module or modules similar to the navigation module 308 may be implemented as part of the other software modules on the wireless device. The steps described may be carried out by a single module or may be carried out by several different modules.

While the present disclosure refers to a the use of a clickable thumbwheel 160, a trackball 160b, a selection button 161, a keyboard 154, a navigation button, an input device, or similar navigation and input mechanisms for navigation on a wireless device 102, it will be appreciated by those skilled in the art that navigation, input or both may be provided by the use of a touchscreen display. The primary display 142, secondary display 143 or both may be a touchscreen display. Navigation or input on a touchscreen display may additionally be by contacting the display directly with fingers, or by using a stylus or a similar pointing device. Navigation by the use of the touchscreen display may be provided in addition to navigation using the input mechanisms described above.

While the present disclosure describes a wireless communication device as an example of a suitable handheld device, the disclosure is not limited to wireless communication devices. A person of ordinary skill in the art would understand that other handheld devices may be suitable. While the present disclosure includes description of a device, a person of ordinary skill in the art will understand that the present disclosure is also directed to a method of providing the described device. While the present disclosure includes description of a method, a person of ordinary skill in the art will understand that the present disclosure is also directed to an apparatus for carrying out the disclosed method and including apparatus parts for performing each described method step, be it by way of hardware components, a computer programmed by appropriate software to enable the practice of the disclosed method, by any combination of the two, or in any other manner. Moreover, an article of manufacture for use with the apparatus, such as a pre-recorded storage device or other similar computer readable medium including program instructions recorded thereon, or a computer data signal carrying computer readable program instructions may direct an apparatus to facilitate the practice of the disclosed method. This disclosure is also directed to a device on which the method may be carried out. It is understood that such apparatus, articles of manufacture, and computer data signals also come within the scope of the present disclosure.

The embodiments of the present disclosure described above are intended to be examples only. Those of skill in the art may effect alterations, modifications and variations to the particular embodiments without departing from the intended scope of the present disclosure. In particular, selected features from one or more of the above-described embodiments may be combined to create alternative embodiments not explicitly described, features suitable for such combinations being readily apparent to persons skilled in the art. The subject matter described herein in the recited claims intends to cover and embrace all suitable changes in technology.

The invention claimed is:

1. A handheld device comprising:
    a processor for controlling the operation of the handheld device;
    a lid having an inner surface and an outer surface opposite to the inner surface;
    a lower casing rotatably coupled to the lid, the lid and the lower casing being rotatable relative to each other about an axis of rotation such that the handheld device is movable between an opened configuration and a closed configuration;
    a primary display on the lid visible in the opened configuration;
    a secondary display on the lid visible in the closed configuration; and
    a non-flush navigation button located within the lid for accepting an input, the non-flush navigation button being accessible from the inner surface of the lid when the device is in the opened configuration, and being accessible from the outer surface of the lid and inaccessible from the inner surface of the lid when the device is in the closed configuration;
    the non-flush navigation button having a primary button orientation in the opened configuration and a secondary button orientation in the closed configuration, the secondary button orientation being flipped about the axis of rotation with respect to the primary button orientation;
    the processor being configured to execute instructions to:
        determine whether the non-flush navigation button is in the primary or the secondary button orientation based on whether the device is in the opened or the closed configuration;
        process navigation input accepted by the non-flush navigation button in a primary or a secondary navigation orientation corresponding to the primary or secondary button orientation of the non-flush navigation button, the secondary navigation orientation being flipped about the axis of rotation with respect to the primary navigation orientation;
        detect whether the device has changed configuration; and
        change the navigation orientation to correspond to the button orientation when the device has changed configuration.

2. The device of claim 1, wherein the lid is received between a pair of coupling portions in the lower casing to enable the rotatable coupling.

3. The device of claim 1, wherein the non-flush navigation button includes a central axis, and the central axis is disposed to accommodate a reach distance of a user's thumb.

4. The device of claim 1, wherein the non-flush navigation button protrudes above the surface of the lid by a maximum distance in the range of about 1 mm to about 2 mm.

5. The device of claim 1 wherein the non-flush navigation button is selected from the group consisting of: a trackball, a joystick, and a rocker button.

6. The device of claim 5 wherein the trackball is a clickable trackball.

7. The device of claim 1 wherein the non-flush navigation button provides navigation in at least two dimensions.

8. The device of claim 7 wherein the non-flush navigation button provides navigation not limited to the Cartesian directions.

9. The device of claim 1 wherein a central axis of the non-flush navigation button is disposed at an angle relative to a general plane of the lid such that the non-flush navigation button is easily accessible in both the opened and the closed configurations.

10. The device of claim 1 wherein the primary display displays a primary GUI, the secondary display displays a secondary GUI, and the non-flush navigation button provides navigation of the primary GUI in the opened configuration and the secondary GUI in the closed configuration.

11. The device of claim 1 wherein the primary button orientation and the secondary button orientation have opposite up/down orientations and the primary navigation orientation and the secondary navigation orientation have corresponding opposite up/down orientations.

12. The device of claim 1 wherein the processor is further configured to execute instructions to provide navigation of a primary GUI in the opened configuration and a secondary GUI in the closed configuration.

13. The device of claim 1 wherein the processor is further configured to execute instructions to:
    detect a device orientation for the device;
    process navigation input using the non-flush navigation button in the navigation orientation corresponding to the device orientation;
    detect whether the device orientation has changed; and
    change the navigation orientation to correspond to the changed device orientation when the device has changed orientation.

14. The device of claim 13 wherein the device orientation corresponds to the device being held upright, upside-down or horizontally.

15. A method for facilitating a non-flush navigation button in a handheld device having a lid having an inner surface and an outer surface opposite to the inner surface and a lower casing rotatably coupled together such that the handheld device is movable about an axis of rotation between an opened and a closed configuration, the handheld device having a primary display visible in the opened configuration and a secondary display visible in the closed configuration, the non-flush navigation button having a primary button orientation in the opened configuration and a secondary button orientation in the closed configuration, the secondary button orientation being flipped about the axis of rotation with respect to the primary button orientation, the method comprising:
    determining whether the non-flush navigation button is in the primary or the secondary button orientation based on whether the device is in the opened or the closed configuration;
    processing navigation input using the non-flush navigation button in a primary or a secondary navigation orientation corresponding to the primary or secondary button orientation of the non-flush navigation button, the secondary navigation orientation being flipped about the axis of rotation with respect to the primary navigation orientation;
    detecting whether the device has changed configuration; and
    changing the navigation orientation to correspond to the button orientation when the device has changed configuration;
    the non-flush navigation button being accessible from the inner surface of the lid when the device is in the opened configuration, and being accessible from the outer surface of the lid and inaccessible from the inner surface of the lid when the device is in the closed configuration.

16. The method of claim 15 wherein the primary button orientation and the secondary button orientation have opposite up/down orientations and the primary navigation orientation and the secondary navigation orientation have corresponding opposite up/down orientations.

17. The method of claim 15 wherein the navigation input is processed in at least two dimensions.

18. The method of claim 17 wherein processing of the navigation input is not limited to the Cartesian directions.

19. The method of claim 15 wherein the navigation input is processed for navigation of a primary GUI in the opened configuration and a secondary GUI in the closed configuration.

20. The method of claim 15 further comprising:
   detecting a device orientation for the device;
   processing navigation input using the non-flush navigation button in a navigation orientation corresponding to the device orientation;
   detecting whether the device orientation has changed; and
   changing the navigation orientation to correspond to the changed device orientation when the device has changed configuration.

21. The method of claim 20 wherein the device orientation corresponds to the device being held upright, upside-down or horizontally.

* * * * *